United States Patent Office 3,364,211
Patented Jan. 16, 1968

3,364,211
METHINE DYES FROM 4-FORMYL-5-PYRAZO-LONES AND BARBITURIC ACID AND DERIVATIVES THEREOF
Lester N. Stanley, Delmar, N.Y., assignor to General Aniline & Film Corporation, New York, N.Y., a corporation of Delaware
No Drawing. Filed Sept. 14, 1964, Ser. No. 396,406
3 Claims. (Cl. 260—240.2)

ABSTRACT OF THE DISCLOSURE

A new class of methine dyes is provided, which are useful for dyeing synthetic fibers, especially polyester fibers, and which are represented by either of the following resonating structures:

(A)

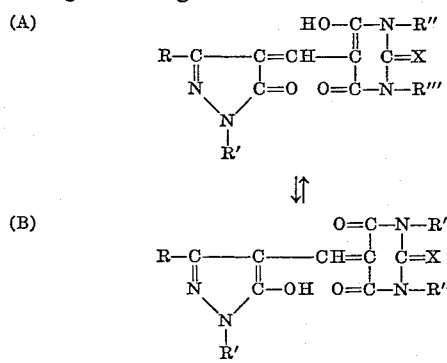

(B)

in which R is a carbalkoxy in which the alkyl contains from 1 to 3 carbon atoms, R' is a member selected from the class consisting of hydrogen, lower alkyl, phenyl, diphenyl and naphthyl, R" and R''' are members selected from the class consisting of hydrogen, lower alkyl, cycloalkyl of from 4 to 8 carbon atoms, phenyl, diphenyl, naphthyl, benzyl and naphthobenzyl, and X is a member selected from the class consisting of oxygen, sulfur and imino.

---

This invention relates to a new and useful class of methine dyes obtained by the condensation of barbituric acid and derivatives thereof with 4-formyl-5-pyrazolones.

It is known that substituted and unsubstituted barbiturates and thiobarbiturates of 1,2,3-trisubstituted pyrazolones are produced by reacting an aldehyde of said pyrazolones with a malonyl-urea or malonyl-thiourea. United State Patent 2,628,233 characterizes the reaction product by either of the two following formulas:

(1)

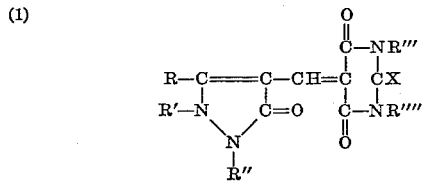

or (2)

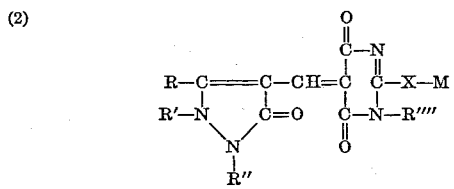

Despite the fact that the compounds of the above formulas are colored, ranging from yellow, yellow-orange to yellow red, they are not useful as dyes, particularly for synthetic fibers such as polyester fiber. This is attributable to the particular chemical structure of the compounds in that their structure is too rigid and has no resonating possibilities. This type of color is so lacking in light fastness, especially on polyester, that it is of no practical value as a dyestuff. It is well recognized that all colored molecules contain one or more doubly bonded groups which are termed "chromophores." In more recent usage the term is applied to a complete conjugated unit, a group of atoms bearing in a continuous chain or network of interacting mobile electrons which may be excited by a single photon (The Chemistry of Synthetic Dyes and Pigments, H. A. Lubs, pages 663–664; The Chemistry of Synthetic Dyes, K. Venkataraman, pages 1012, 1121 and 1146).

K. Venkataraman in his text points out in volume 1, page 334, that "if it is possible to assign to a molecule two or more reasonable electronic structures, and if certain other conditions are satisfied, the normal state of the molecule cannot be represented by any of the structures alone, but is compounded of all of the structures. The molecule is a 'resonance hybrid' of the various structures (or systems of pairing the electrons; 'set of canonical structures') and is more stable (i.e., has lower energy) than any individual structure." In the same volume, but on page 341, Venkataraman points out: "A single chromophoric group, such as the vinylene

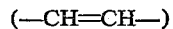

group, absorbs in the ultraviolet, and to produce visible color two or more chromophores conjugated with each other are necessary. Further, unsaturation in dye molecules is usually associated with oxygen and nitrogen atoms in a manner which enables ready reversal of the linkages in the conjugate chain, so that dye molecules are resonance hybrids. It then becomes necessary to speak of a chromophoric system or systems in a dye molecule, rather than single chromophores."

I have found that an aldehyde of an unsubstituted 5-pyrazolone or an aldehyde of a 5-pyrazolone containing a mono-substituent either in the 1 or 3 position or disubstituted in the 1,3-positions reacts readily with barbituric acid and derivatives thereof to yield a new class of methine dyes which are useful for dyeing synthetic fibers, especially polyester fiber. The dyes of this invention are represented by either of the two following resonating structures:

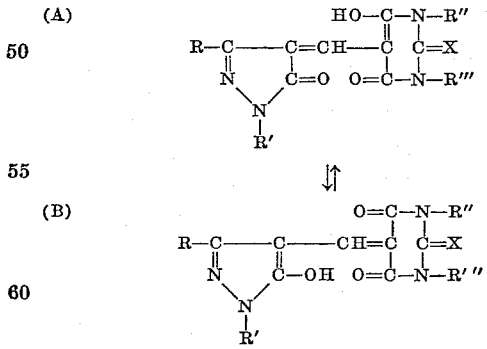

in which R is either hydrogen, a lower alkyl of from 1 to 3 carbon atoms, e.g., methyl, ethyl, propyl or isopropyl; carbalkoxy in which the alkyl contains from 1 to 3 carbon atoms, e.g. carbomethoxy, carbethoxy, carbopropoxy; carbamyl or a mono-alkyl or di-alkyl carbonamide in which the alkyl contains from 1 to 3 carbon atoms; aryl, e.g. phenyl, diphenyl or naphthyl; $R^1$ is either hydrogen, or lower alkyl or aryl of the same values as R and in addition may be a substituted aryl, e.g. phenyl, diphenyl or naphthyl substituted by either alkyl or alkoxy of from 1 to 3 carbon atoms, cyano, sulfamyl or a mono-alkyl or di-alkyl sulfonamide wherein the alkyl contains from 1 to 3 carbon atoms, carbamyl, mono-halo or di-halo group, e.g. bromine, chlorine or fluorine; or by a mono-alkyl or di-alkyl carbonamide group wherein the alkyl contains from 1 to 3 carbon atoms; R" and R'" represent either hydrogen, lower alkyl of from 1 to 3 carbon atoms, cycloalkyl of from 4 to 8 carbon atoms, substituted and unsubstituted aryl of the same values as in R and R', or aralkyl such as benzyl or naphthobenzyl, and X represents either oxygen, sulfur or imino (imido). It is to be noted that the nature or character of the substituents represented by R, R', R" and R'" is immaterial so long as they are free from chromophoric and solubilizing groups. It is to be further noted that it is essential that the 4-formyl-5-pyrazolone be free from any substituents in the 2-position thereof, and that the barbituric acid compound be free from any substituents in the 5-position thereof.

From Formulas A and B, it will be noted that the new class of methine dyes of this invention are conjugated and have the resonating structure necessary for a dye of good fastness properties.

The new class of methine dyes of this invention are readily prepared by condensing approximately equivalent amounts of a 4-formyl-5-pyrazolone compound with a barbituric acid compound, although an excess up to about 10% of either reactant may be employed if desired. The condensation may be carried out in the presence of an inert solvent, such as ethanol, isopropanol, chlorobenzene, etc., but is preferably carried out by mixing the two intermediates and heating the mixture from about 100° C. to 140° C. until reaction is complete, which is usually from about 2 to 5 hours. The product is obtained as a fused mass which is readily ground to a powder which, in dispersed form, is an excellent dye for synthetic fibers, particularly polyester fiber.

The dyes may also be produced in situ. To produce the dye in this manner the 4-formyl-5-pyrazolone compound is dispersed in water with a suitable dispersing agent, for example anionic surfactants such as alkylnaphthalenesulfonic acid, ligninsulfonic acid, and other sulfonated condensation products. The synthetic fiber is impregnated with this solution at or near the boil until adsorption occurs. The fiber is removed and rinsed. The condensation is carried out by immersing the impregnated fiber in a hot aqueous solution of the barbituric acid compound.

The following compounds exemplify the 4-formyl-5-pyrozolones which may be employed in the production of dyes of this invention:

4-formyl-5-pyrazolone
4-formyl-1-methyl-5-pyrazolone
4-formyl-1,3-dimethyl-5-pyrazolone
4-formyl-3-methyl-5-pyrazolone
4-formyl-1-phenyl-3-methyl-5-pyrazolone
4-formyl-1-(2,5-dichlorophenyl)-3-methyl-5-pyrazolone
4-formyl-1-(m-anisyl)-3-methyl-5-pyrazolone
4-formyl-1-(p-tolyl)-3-methyl-5-pyrazolone
4-formyl-1-(6-methyl-m-anisyl)-3-methyl-5-pyrazolone
4-formyl-1-(3-trifluoromethylphenyl)-3-methyl-5-pyrazolone
4-formyl-1-(3-cyanophenyl)-3-methyl-5-pyrazolone
4-formyl-1-(3-sulfamylphenyl)-3-methyl-5-pyrazolone
4-formyl-1-(3-dimethylsulfamylphenyl)-3-methyl-5-pyrazolone
4-formyl-1-(3-carbamylphenyl)-3-methyl-5-pyrazolone
4-formyl-1-(2-naphthyl)-3-methyl-5-pyrazolone
4-formyl-1-(p-diphenyl)-3-methyl-5-pyrazolone
4-formyl-1,3-diphenyl-5-pyrazolone
4-formyl-1-methyl-3-carbomethoxy-5-pyrazolone
4-formyl-1-phenyl-3-carbomethoxy-5-pyrazolone
4-formyl-1-phenyl-3-carbethoxy-5-pyrazolone
4-formyl-1-phenyl-3-carbamyl-5-pyrazolone
4-formyl-1-phenyl-3-(dimethylcarbamyl)-5-pyrazolone
4-formyl-1-phenyl-3-(ethylcarbamyl)-5-pyrazolone The following compounds exemplify the barbituric acid compounds which may be employed in the production of the dyes of this invention:

barbituric acid
1-methylbarbituric acid
1,3-dimethylbarbituric acid
1-ethylbarbituric acid
1-ethyl-3-methylbarbituric acid
1,3-diethylbarbituric acid
1-benzylbarbituric acid
1-cyclohexylbarbituric acid
1-phenylbarbituric acid
1-chlorophenylbarbituric acid
1,3-diphenylbarbituric acid
2-thiobarbituric acid
1-methyl-2-thiobarbituric acid
1,3-dimethyl-2-thiobarbituric acid
1-phenyl-2-thiobarbituric acid
1,3-diphenyl-2-thiobarbituric acid
2-iminobarbituric acid
1-methyl-2-iminobarbituric acid
1,3-dimethyl-2-iminobarbituric acid
1-phenyl-2-iminobarbituric acid
1,3-diphenyl-2-iminobarbituric acid The dyes of this invention have outstanding properties. The greener the shade of a yellow dye the more preferable is the dye. In particular, the dye made from 4-formyl-1-phenyl-3-methyl-5-pyrazolone and barbituric acid is a very desirable greenish yellow shade. Its light fastness is excellent, as is its fastness to dry cleaning and crock fastness. It also has outstanding sublimation fastness which is a very necessary property if the dye is to be applied to fiber by the Thermosol process, that is, by padding the fiber with a solution of dispersed dye, drying, and then subjecting the padded fiber to a temperature of about 350–450° F., preferably 410–435° F. for ½ to 2 minutes. If the dye sublimes readily, not only does the fiber lose color but the sublimed dye goes onto the equipment and out into the atmosphere. The dye also has good build-up on the fiber.

The following examples will illustrate how the dyes of this invention are prepared and applied to synthetic fibers.

EXAMPLE 1

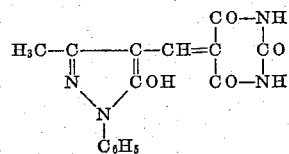

50 grams of 4-formyl-1-phenyl-3-methyl-5-pyrazolone and 32 grams of barbituric acid were mixed together and heated on an oil bath starting at 110° C. It was heated to 135° C. in about an hour and maintained at about 135–140° C. for 2 hours, and then cooled to 30° C. The fused product was ground thoroughly to a yellow powder.

A dispersion was made by mixing 8 grams of the powder with 11 grams of Marasperse CB (sodium lignosulfonate), 0.5 gram of Nekal WS-25 (sulfonated aliphatic polyester), and 0.2 gram of soda ash, wetting with water to mix, then evaporating the water to a viscous milling stage and viscous milling for about 6 hours and drying to a powder.

One ounce of the powdered dye preparation was dispersed in 1 gallon of water and then thickened to padding consistency with 0.2 ounce of Keltex gum (gum tragacanth) and 0.1 ounce of Leonil SA (anionic naphthalenesulfonate dispersing agent). A 5½ x 8-inch piece of Dacron polyester fabric was padded with the above at 160° F. and dried. The material was subjected to a temperature of 425° F. for 1½ minutes. The material was soaped for 5 minutes at the boil, rinsed and dried. A bright greenish yellow dyeing was obtained. When exposed to a standard fadeometer there was only a trace of a light break at 210 hours. In a sublimation test there was no stain. It had excellent dry cleaning and crocking fastness. A second dyeing was made at 6 ounces of dye dispersion per 1 gallon of water. This likewise gave an excellent strong, bright dyeing with good build-up in strength, light fast 210 hours and in sublimation test only a very slight stain.

EXAMPLE 2

A 5% aqueous dispersion of 4-formyl-1-phenyl-3-methyl-5-pyrazolone with an equal amount of Tamol (formaldehydealkylnaphthalenesulfonic acid sodium salt) was made up. A swatch of Dacron polyester fiber was immersed in the solution which was gradually brought to the boil and maintained for 1 hour. The fabric was removed and rinsed and then immersed in a hot 5% aqueous solution of barbituric acid. After the color had developed, the fabric was removed, rinsed and dried. The quality of the dyeing was commensurate with that of Example 1.

EXAMPLE 3

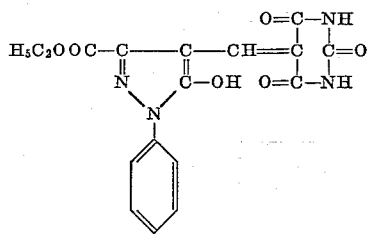

62 grams of 4-formyl-1-phenyl-3-carbethoxy-5-pyrazolone and 32 grams of barbituric acid were reacted together as in Example 1 and the fused product ground to a yellow powder.

The powder was dispersed and a dyeing made on the basis of 3 ounces of dispersed dye preparation per gallon of water as in Example 1. A yellow dyeing having excellent properties was obtained.

EXAMPLE 4

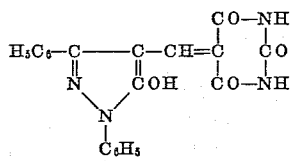

66 grams of 4-formyl-1,3-diphenyl-5-pyrazolone and 32 grams of barbituric acid were reacted together as in Example 1 and the fused product ground to a yellow powder.

The powder was dispersed and a dyeing made on the basis of 3 ounces of dispersed dye preparation per gallon of water as in Example 1. A golden yellow dyeing having excellent properties was obtained.

EXAMPLE 5

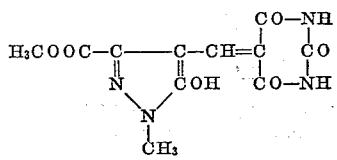

43 grams of 4-formyl-1-methyl-3-carbomethoxy-5-pyrazolone and 32 grams of barbituric acid were reacted together as in Example 1 and the fused product ground to a yellow powder.

The powder was dispersed and a dyeing made on the basis of 4 ounces of dispersed dye preparation per gallon of water as in Example 1. A yellow dyeing having excellent properties was obtained.

EXAMPLE 6

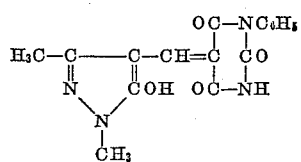

35 grams of 4-formyl-1,3-dimethyl-5-pyrazolone and 51 grams of 1-phenylbarbituric acid were reacted together as in Example 1 and the fused product ground to a yellow powder.

The powder was dispersed and a dyeing made on the basis of 4 ounces of dispersed dye preparation per gallon of water as in Example 1. A yellow dyeing having excellent properties was obtained.

EXAMPLE 7

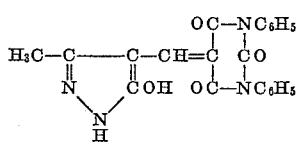

31.5 grams of 4-formyl-3-methyl-5-pyrazolone and 70 grams of 1,3-diphenylbarbituric acid were reacted together as in Example 1 and the fused product ground to a yellow powder.

The powder was dispersed and a dyeing made on the basis of 4 ounces of dispersed dye preparation per gallon of water as in Example 1. A yellow dyeing having excellent properties was obtained.

EXAMPLE 8

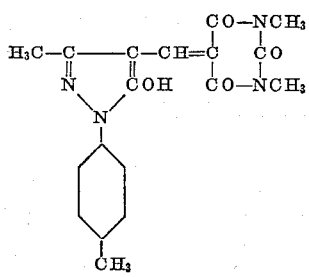

54 grams of 4-formyl-1-(p-tolyl)-3-methyl-5-pyrazolone and 39 grams of 1,3-dimethylbarbituric acid were reacted together as in Example 1 and the fused product ground to a yellow powder.

The powder was dispersed and a dyeing made on the basis of 3 ounces of dispersed dye preparation per gallon of water as in Example 1. A yellow dyeing having excellent properties was obtained.

EXAMPLE 9

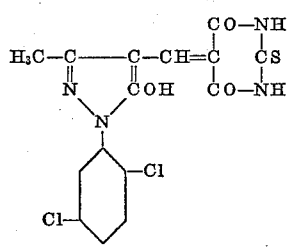

67 grams of 4-formyl-1(2,5-dichlorophenyl)-3-methyl-5-pyrazolone and 36 grams of thiobarbituric acid were reacted together as in Example 1 and the fused product ground to an orange-yellow powder.

The powder was dispersed and a dyeing made on the basis of 3 ounces of dispersed dye preparation per gallon of water as in Example 1. An orange yellow dyeing having excellent properties was obtained.

EXAMPLE 10

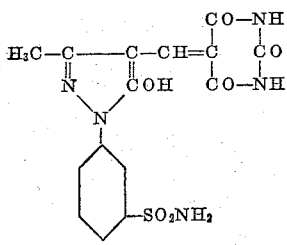

70 grams of 4-formyl-1(3-sulfamylphenyl)-3-methyl-5-pyrazolone and 32 grams of barbituric acid were reacted together as in Example 1 and the fused product ground to a yellow powder.

The powder was dispersed and a dyeing made on the basis of 3 ounces of dispersed dye preparation per gallon of water as in Example 1. A yellow dyeing having excellent properties was obtained.

EXAMPLE 11

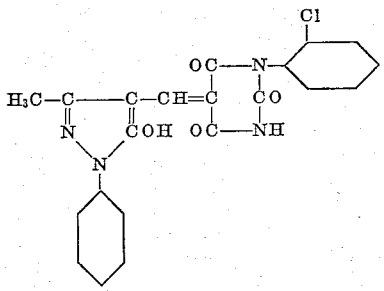

50 grams of 4-formyl-1-phenyl-3-methyl-5-pyrazolone and 57.7 grams of 1-(2-chlorophenyl) barbituric acid were reacted together as in Example 1 and the fused product ground to a yellow powder.

The powder was dispersed and a dyeing made on the basis of 3 ounces of dispersed dye preparation per gallon of water as in Example 1. A yellow dyeing having excellent properties was obtained.

EXAMPLE 12

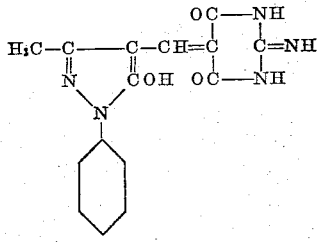

50 grams of 4-formyl-1-phenyl-3-methyl-5-pyrazolone and 32 grams of 2-iminobarbituric acid were reacted together as in Example 1 and the fused product ground to a yellow powder.

The powder was dispersed and a dyeing made on the basis of 3 ounces of dispersed dye preparation per gallon of water as in Example 1. A yellow dyeing was obtained which had excellent properties.

EXAMPLE 13

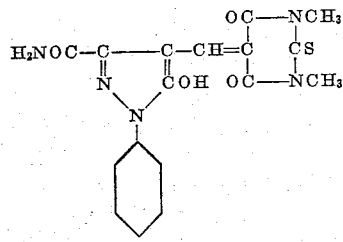

57.5 grams of 4-formyl-1-phenyl-3-carbamyl-5-pyrazolone and 43 grams of 1,3-dimethylthiobarbituric acid were reacted together as in Example 1 and the fused product ground to an orange-yellow powder.

The powder was dispersed and a dyeing made on the basis of 3 ounces of dispersed dye preparation per gallon of water as in Example 1. An orange yellow dyeing was obtained which had excellent properties.

EXAMPLE 14

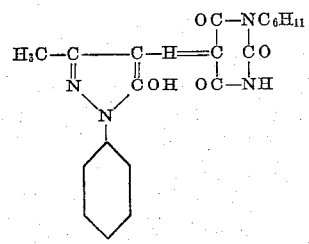

50 grams of 4-formyl-1-phenyl-3-methyl-5-pyrazolone and 52.5 grams of 1-cyclohexylbarbituric acid were reacted together as in Example 1 and the fused product ground to a yellow powder.

The powder was dispersed and a dyeing made on the basis of 3 ounces of dispersed dye preparation per gallon of water as in Example 1. A yellow dyeing was obtained which had excellent properties.

EXAMPLE 15

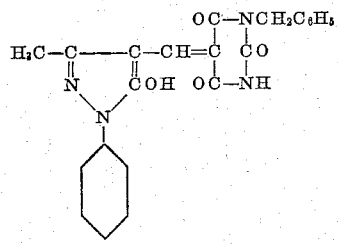

50 grams of 4-formyl-1-phenyl-3-mehytl-5-pyrazolone and 54.5 grams of 1-benzylbarbituric acid were reacted together as in Example 1 and the fused product ground to a yellow powder.

The powder was dispersed and a dyeing made on the basis of 3 ounces of dispersed dye preparation per gallon of water as in Example 1. A yellow dyeing was obtained which had excellent properties.

I claim:

1. A methine dye selected from the class consisting of compounds having the following formulae:

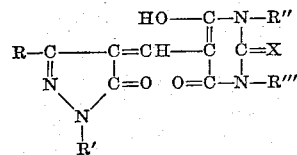

and

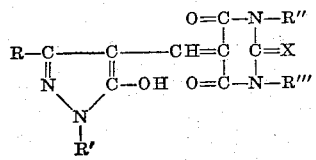

wherein R is a carbalkoxy in which the alkyl contains from 1 to 3 carbon atoms, R' is a member selected from the class consisting of hydrogen, lower alkyl, phenyl, diphenyl and naphthyl, R'' and R''' are members selected from the class consisting of hydrogen, lower alkyl, cycloalkyl of from 4 to 8 carbon atoms, phenyl, diphenyl, naphthyl, benzyl and naphthobenzyl, and X is a member selected from the class consisting of oxygen, sulfur and imino.

2. A methine dye having the formula:
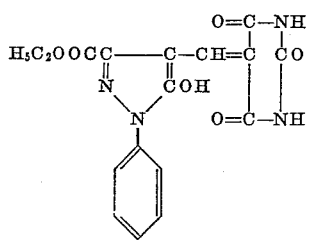
3. A methine dye having the formula:
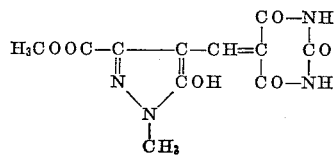
References Cited
UNITED STATES PATENTS
2,611,696  9/1952  Keyes et al. ---------- 95—8
2,628,233  2/1953  Ledrut ------------- 260—240
JOHN D. RANDOLPH, *Primary Examiner.*